(No Model.)
L. G. McKNIGHT.
FEED ROLLER.
No. 445,123. Patented Jan. 20, 1891.
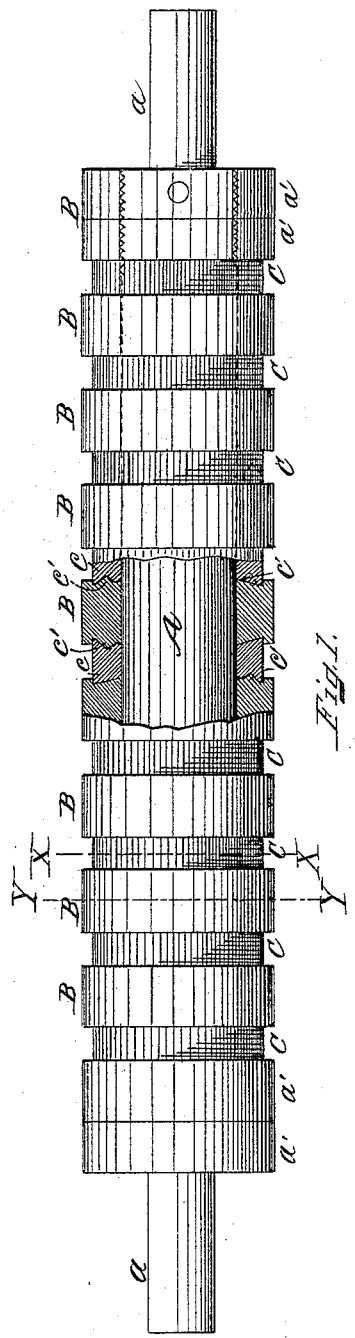
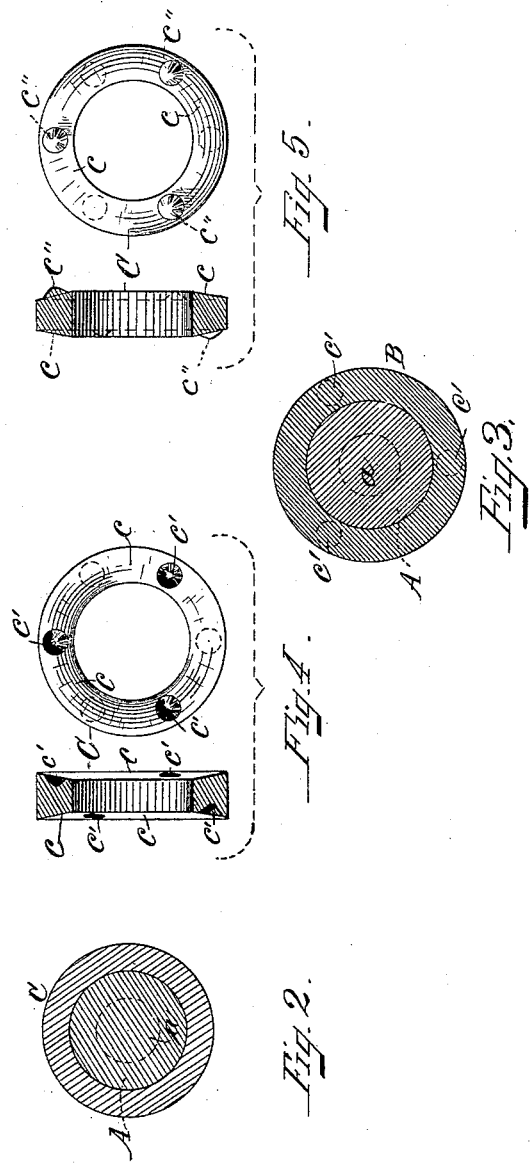
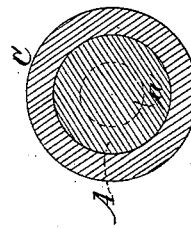

UNITED STATES PATENT OFFICE.

LEVI G. McKNIGHT, OF WEST GARDNER, MASSACHUSETTS.

FEED-ROLLER.

SPECIFICATION forming part of Letters Patent No. 445,123, dated January 20, 1891.

Application filed April 23, 1890. Serial No. 349,108. (No model.)

*To all whom it may concern:*

Be it known that I, LEVI G. McKNIGHT, a citizen of the United States, and a resident of West Gardner, in the county of Worcester and State of Massachusetts, have invented new and useful Improvements in Feed-Rollers, of which the following, taken in connection with the accompanying drawings, is a specification.

This invention relates to improvements in feed-rollers for wood-working or other machines, and it is carried out as follows, reference being had to the accompanying drawings, wherein—

Figure 1 represents a side elevation of the improved feed-roller, partly shown in section. Fig. 2 represents a cross-section on the line X X shown in Fig. 1. Fig. 3 represents a cross-section on the line Y Y, also shown in Fig. 1. Fig. 4 represents in cross-section and end elevation one of the metallic washers, and Fig. 5 represents in cross-section and end elevation a modified form of such metallic washer.

Similar letters refer to similar parts wherever they occur on the different parts of the drawings.

A represents the cylindrical metal shaft, which forms the central part or core of the improved feed-roller, said shaft having journal ends $a$ $a$ adapted to be supported in suitable bearings in a machine, as usual. On said shaft or core is arranged a series of alternate india-rubber rings B B and intermediate metal washers C C, as shown.

The rubber rings B B are each a little larger in diameter than the metal washers C C, as shown in Fig. 1, so as to prevent contact between the latter and the article that is fed forward by the rubber rings B B. The said rubber rings and metal washers are secured together on the shaft or core A by means of nuts $a'$ $a'$, screwed on the ends of said shaft or core, as is common in devices of this kind.

It is very essential in a roller of this kind that its rubber washers should be prevented from slipping on the shaft or core, and for this purpose I make the annular faces of said rings inclined or tapering, concave or convex, as shown at $c$ $c$ in Figs. 1, 4, and 5, so as to cause their projecting annular edges to be crowded and forced into the ends of the yielding rubber rings B B, as shown in Fig. 1, and by this arrangement the series of rubber rings and metal washers are firmly secured together and to the shaft A by means of the nuts $a'$ $a'$. For the purpose of still further securing the rubber rings and metal washers together, I prefer to make recesses $c'$ $c'$ in the inclined faces of the metal washers C, as shown in Figs. 1 and 4, into which recesses a portion of the ends of the rubber rings are forced when the nuts $a'$ $a'$ are tightened, thus locking the rubber rings and metal washers together. Instead of such locking-recesses $c'$ $c'$, I may to equal advantage employ projections $c''$ $c''$ on the ends of the metal washers, as shown in Fig. 5, such projections being adapted to be forced into the ends of the rubber rings when the nuts $a'$ $a'$ are tightened.

Having thus fully described the nature, construction, and operation of my invention, I wish to secure by Letters Patent and claim—

The improved feed-roller, consisting of a central shaft A and a series of alternate rubber rings arranged thereon, combined with the intermediate metal washers C C, having inclined faces and notches or projections, substantially as and for the purpose set forth.

In testimony whereof I have signed my name to this specification, in the presence of two subscribing witnesses, on this 19th day of April, A. D. 1890.

LEVI G. McKNIGHT.

Witnesses:
ALBAN ANDRÉN,
ALICE A. PERKINS.